United States Patent [19]

Johnson, Jr.

[11] Patent Number: 4,736,300

[45] Date of Patent: * Apr. 5, 1988

[54] AUTOMATIC GAIN CONTROL OF FORMATION MEASUREMENTS BY VARYING INDUCED CURRENT FLOW

[75] Inventor: Wade M. Johnson, Jr., Cypress, Tex.

[73] Assignee: Western Atlas International, Inc., Houston, Tex.

[*] Notice: The portion of the term of this patent subsequent to Apr. 30, 2002 has been disclaimed.

[21] Appl. No.: 648,206

[22] Filed: Sep. 7, 1984

Related U.S. Application Data

[63] Continuation of Ser. No. 373,777, Apr. 30, 1982, abandoned.

[51] Int. Cl.$^4$ .............................................. G01V 3/28
[52] U.S. Cl. .................................... 364/422; 324/366; 367/65
[58] Field of Search ...................... 364/422; 367/67, 65; 330/51, 218; 324/357, 366

[56] References Cited

U.S. PATENT DOCUMENTS

| | | | |
|---|---|---|---|
| 2,712,627 | 7/1955 | Doll | 324/352 |
| 2,776,402 | 1/1957 | Kokesh | 324/373 |
| 3,056,917 | 10/1962 | Tanguy | 324/366 |
| 3,150,314 | 9/1964 | Tanguy | 324/339 |
| 3,457,499 | 7/1969 | Tanguy | 324/323 |
| 3,525,948 | 8/1970 | Sherer et al. | 330/51 |
| 3,539,910 | 11/1970 | Henry et al. | 324/366 |
| 3,772,589 | 11/1973 | Scholberg | 324/373 |
| 3,919,685 | 11/1975 | Haill | 367/65 |
| 3,944,942 | 3/1976 | Chudleigh, Jr. | 330/86 |
| 3,947,756 | 3/1976 | Ryss et al. | 324/357 |
| 4,010,462 | 3/1977 | Armistead | 340/347 DA |
| 4,016,557 | 4/1977 | Zitelli et al. | 340/347 AD |
| 4,027,281 | 5/1977 | Greve et al. | 367/28 |
| 4,064,480 | 12/1977 | Howlett | 367/67 |
| 4,084,151 | 4/1978 | Penner | 367/60 |
| 4,251,773 | 2/1981 | Cailliau et al. | 324/347 |
| 4,282,486 | 8/1981 | Culver et al. | 324/371 |
| 4,412,207 | 10/1983 | Sinclair | 340/347 AD |
| 4,414,638 | 11/1983 | Talambiras | 364/571 |

OTHER PUBLICATIONS

European Patent Search Report no. 93261, published Nov. 9, 1983, based on application no. 83102903.

Doll, H. G., "The Microlaterlog", *Petroleum Transactions, AIME*, vol. 198, Jan. 1953, pp 17-32.

Doll, H. G., "The Laterolog: A New Resistivity Logging Method with Electrodes Using an Automated Focusing System", *Petroleum Transactions, AIME*, vol. 192, Nov. 1951, pp 305-316.

Electronics International, vol. 53, no. 11, May 1980, p. 137, N.Y. U.S.A., L. Y. Hung, "Low-Cost Autoranger Scales DVM over four decades".

*Primary Examiner*—Jerry Smith
*Assistant Examiner*—Clark A. Jablon
*Attorney, Agent, or Firm*—Patrick H. McCollum

[57] ABSTRACT

In apparatus for investigating earth formations traversed by a borehole, improved methods and apparatus are provided for performing inductive type formation measurements. A transmitter coil of a well logging tool moving through a borehole emits an alternating field into the adjacent earth formation thus inducing eddy currents therein. A voltage in a receiver coil in the tool is sampled at discrete elevations as the tool traverses the borehole and amplified. This voltage is phase detected with respect to the transmitter coil voltage to insure that the measured receiver voltage corresponds to the currents induced in the formation. An average of these voltage measurements is formed. Variations in the magnitude of the average phase-detected voltage are used to discretely control the amplitude of the alternating current induced into the formation.

19 Claims, 8 Drawing Sheets

AUTOMATIC GAIN CONTROL OF FORMATION MEASUREMENTS BY VARYING INDUCED CURRENT FLOW

This application is a continuation of application Ser. No. 06/373,777, filed Apr. 30, 1982 now abandoned.

BACKGROUND OF THE INVENTION

This invention relates to methods and apparatus for investigating earth formations traversed by a borehole, and more particularly relates to methods and apparatus for achieving range control of formation measurements.

It is well known that many of the parameters which are desirably measured in a well logging operation vary over large dynamic ranges from borehole to borehole and within a particular borehole itself due to variations in formation characteristics sought to be investigated.

As but one example, in the case of electrical logging, it has been found that formation resistivities encountered may vary from 0.2 ohm-meters to over 10,000 ohm-meters. In the early instruments for measuring such resistivities, typically a constant reference voltage (or current) was induced into the formation and a measure voltage which thus varied as a function of changing formation resistivities was detected. One exemplary type of such instrument is disclosed, for example, in U.S. Pat. No. 2,712,627 to H. G. Doll.

However, it was found that as the formation conductivity varied from 5 MHO/m to 0.5 mMHO/m this measure voltage would typically vary over a 10,000:1 ratio, exceeding the dynamic range capability of even the best instrumentation amplifiers and the like, particulary in the adverse conditions encountered in the borehole. Clearly, some means was desirable to reduce the necessity of providing downhole circuitry associated with measurement of these parameters which would maintain accuracy over such large signal ranges.

One such attempt to reduce the aforementioned dynamic range problem is disclosed in U.S. Pat. No. 2,776,402 to F. P. Kokesh. The approach essentially was to employ a surveying current which diminished systematically as formation resistivity increased, resulting in measurements of resistivity which became non-linear as full scale value was approached. This approach is not unlike the attempt of logging operators in the past to manually adjust survey currents during logging operations, a practice which was fraught with difficulties which included variation in operator response time (resulting in lost data), lack of recording the magnitude of current changes rendering absolute resisitivity measurements impossible and the like.

While this technique tended to reduce the dynamic range problem somewhat, a major disadvantage was that it required anticipation of the formation resistivity range to be encountered, in that the value of a resistive means utilized to reduce the survey current was selected in accordance therewith.

Yet another approach was taught by L. Henry, et al in U.S. Pat. No. 3,539,910. In this technique, means were provided for adjusting the survey current so as to maintain the product of the current and the resulting measured voltage constant (i.e., a constant power system), resulting in a dynamic range reduction of a square root factor.

This approach however also suffered from major disadvantages, only one of which being, for example, that multiplying circuitry for providing the current-voltage product was typically extremely sensitive to temperature variations and other conditions of the deleterious environment of a borehole, rendering their application impracticable Yet another problem with the previous attempts to achieve a range control in well logging devices particularly of the resistivity measuring type is that any such adjustments in gains were generally made based upon current parameter measurements and were thus relatively unsophisticated in a sense that a decision to change gain was based upon a relatively simple criteria which was invariant and thus insensitive to previously measured parameters. Provision has not been made therefore for adaptive gain ranging wherein the gain may be adjusted as a function of a history of plurality of prior measurements.

Although some prior devices such as those discussed above achieve such range control by adjusting current or voltage signals, they do not record the magnitudes of such gain adjustments. Such recorded adjustments may be used to obtain representation of actual formation resistivities rather than merely relative changes in resistivity.

Thus, the prior devices, by not making use of the adjustment magnitudes, thereby discard valuable information which may be used to more particularly determine the nature of the formation being investigated. The present invention overcomes this disadvantage by recording and utilizing the magnitudes of these adjustments.

With respect to inductive-type formation measurements, it is conventional to introduce into the formation, by means of an appropriate transmitter coil, an alternating field having a nominal frequency of, for example, 20 KHz, thereby inducing eddy currents into the formation. Fields from the induced eddy currents induce signals in a receiver coil which are thereafter routed to a phase sensitive detector so as to measure only those voltages corresponding to the induced currents and formation characteristic to be measured, thus rejecting, e.g., the relatively large voltage which is 90° out of phase therewith corresponding to voltage induced in the receiver from transformer-type coupling from the transmitter coil to the receiver coil.

In the previously described formation measuring techniques in which current directly introduced therein by an electrode pad or "button" is measured, noise rejection frequently is not as problematical as in induced currenttype measurements. One reason for this is that the aforementioned receiver-transmitter mutual transformer coupling noise signal, which is 90° out of phase from the desired eddy current signal and relatively large with respect thereto, is not present in such other systems. Thus, detection techniques other than phase detection, such as peak envelope detection, may be successfully employed.

One problem associated with such measurements of induced current is that typically the accuracy of phase detectors known in the art is sensitive to the magnitude of the dynamic amplitude range or swing of its input signal. Thus, prior art devices, by not seeking to automatically control measurement signal amplitudes seen by the phase detector were limited in the resolution of the desired measurement signals.

The disadvantages of the prior art are overcome by the present invention and the improved methods and apparatus are provided for achieving range control of measurements resulting from earth formation investigating apparatus.

SUMMARY OF THE INVENTION

In apparatus for investigating earth formations traversed by a borehole, improved methods and apparatus are provided for achieving range control of formation measurements. A transmitter means carried by a logging tool injects an alternating field preferably having a frequency of 20 KHz into the surrounding formation, thereby in turn inducing eddy current flow in the earth formation. Responsive to the eddy current flow is a receiver circuit means for deriving the apparent magnitude of the current flow. The received signal is amplified and routed to a phase-sensitive detector resulting in detection of voltages substantially corresponding to that of the induced formation current to be measured and rejection, for example, of signals 90° out of phase therewith corresponding to voltages introduced in the receiver from the transmitter by transformer coupling type phenomenon. An averaging means derives a function of such detected current flow and at least one other previously detected current flow. A comparator means interconnected with the averaging means detects when the function is outside a predetermined standard magnitude range. Interconnected with the comparator means is a correction means for adjusting the amplitude of the received signals, when the function is outside the range prior to their being routed to the phase detector. In an alternate embodiment the correction means adjusts the magnitude of the alternating current to the transmitter, rather than the receiver amplifier gain. The magnitude of adjustment as well as the measured, apparent magnitude of the current flow are separately recorded and later correlated to obtain a visual or numerical representation of the measurement.

It is a feature of the present invention to automatically and discretely alter the range of magnitudes of currents induced into an earth formation between an upper and a lower limit to provide increased accuracy in measuring formation characteristics.

It is another feature of the present invention to automatically and discretely adjust the magnitude of signals after receipt corresponding, in part, to eddy currents induced into a formation, between an upper and a lower limit to provide increased accuracy in measuring formation characteristics.

It is another feature of the present invention to employ a history of previously measured magnitudes of received signals to adjust subsequent receiver gain or current flows thereby maintaining formation measurements between an upper and a lower limit.

It is yet another feature of the present invention to adjust receiver gain or magnitude of eddy current flow induced in a formation by well logging apparatus in discrete steps as a function of prior measured eddy current flows.

It is still another feature of the present invention to transmit to the surface magnitudes of adjustments made in an induction well logging apparatus in response to prior measurements.

These and other features and advantages of the present invention will become apparent from the following detailed description of a preferred embodiment.

IN THE DRAWINGS

DETAILED DESCRIPTION

The present invention relates to methods and apparatus for achieving range control of formation measurements. As such it is contemplated that the teachings herein will have beneficial application to numerous well logging tools wherein large dynamic parametric ranges are encountered. Accordingly, all such applications are within the scope of the subject invention and the invention is thus not intended to be limited by disclosure of its application with respect to one particular class of logging tools.

One example of such range control is in the class of tools wherein measurement of conductivity or its inverse, resistivity, of the earth formation is desired due to the previously noted large ranges in formation resistivity frequently encountered. The general techniques of injecting current flow into the formation to be measured and monitoring the potential drop across a resistor in series therewith as an indication of formation coductivity is well known in the art. Numerous techniques have been devised for example for insuring, by various combinations of electrodes and associated circuitry, that current flows into the formation and not the drilling fluid in order that potential drop and thus the resistivity measured is that of the formation and not the fluid.

Thus, detailed discussion of the various techniques associated with resistivity logging will not be herein offered. Rather, the discussion of H. G. Doll "The Micro Laterolog", *Journal of Petroleum Technology*, January 1953, and "The Laterolog" *Journal of Petroleum Technology*, November 1951.

One particular form of resistivity logging involves conceptually the application of four resistivity log instruments disposed in quadrature in a plane perpendicular to the logging string in a manner so as to inject current and thus to measure resistance at four quadrants perpendicular to the axis of the borehole. By comparing the four resistivity measurements derived at various borehole increments, indications of formation dip and the like may be derived which are, in like manner, known in the art and thus not herein detailed.

Figure 1:
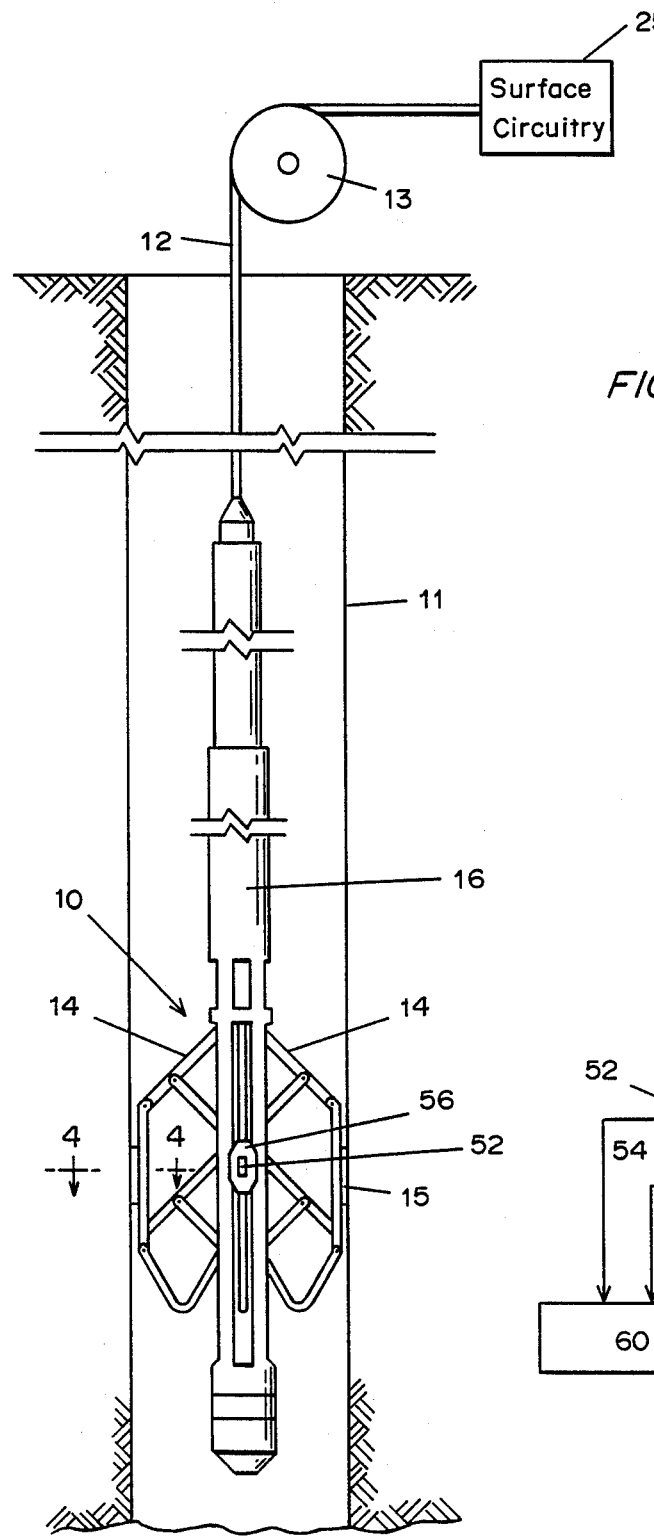
FIG. 1 is a cross-sectional view of one embodiment of the present invention employing a representative formation measuring device of the dip meter type disposed in a borehole.

Referring first to FIG. 1, there may be seen a typical formation resistivity measuring well logging tool (in this case a dip meter tool 10) suited to the teachings of the present invention. In a typical operation, tool 10 is lowered down borehole 11 by means of cable 12 and winch 13. Tool 10 has one or more arms 14 and corresponding probe pads 15 for contacting the sides of borehole 11 to obtain formation data. Affixed to each probe pad 15 is an emitting pad "button" or electrode 52 for emitting currents into the surrounding earth formation. Each probe pad 15 also has a metal guard electrode 56 which encircles and is concentric with emitting electrode 52. Metal guard electrode 56 acts to ensure that the potential difference across the entire pad remains near zero to insure that current is injected into the formation, thus preventing survey current from flowing up the borehole without entering the formation. The measured voltages are processed and interpreted by processing circuitry 16 generaly located in the upper portion of tool 10. Also located in tool 10 is telemetry circuitry for transferring data between the tool and surface circuitry 25, as is more fully discussed below.

Figure 2A:
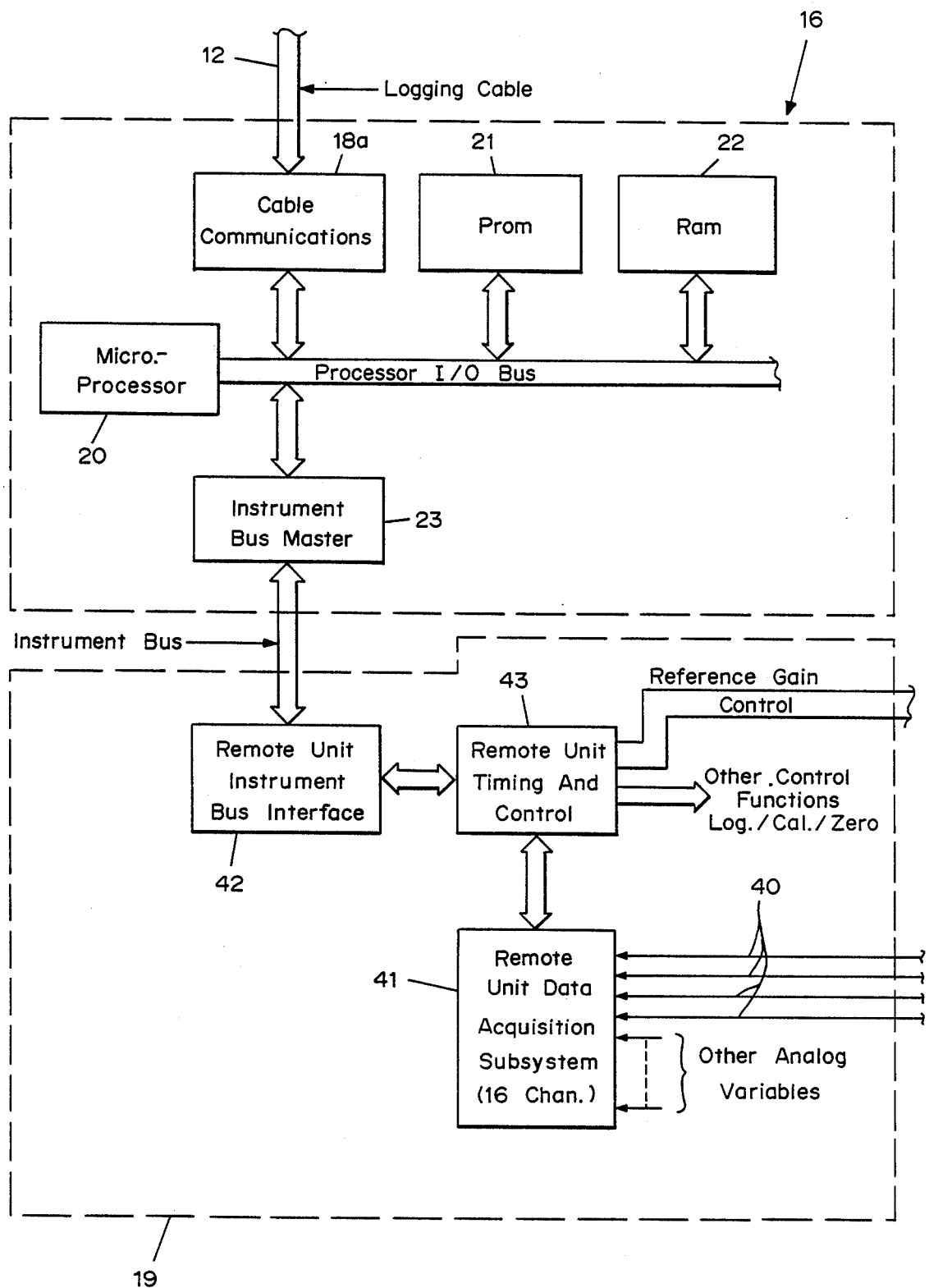
FIGS. 2A and 2B are functional block diagrams of well logging apparatus according to the present invention.
Figure 2B:
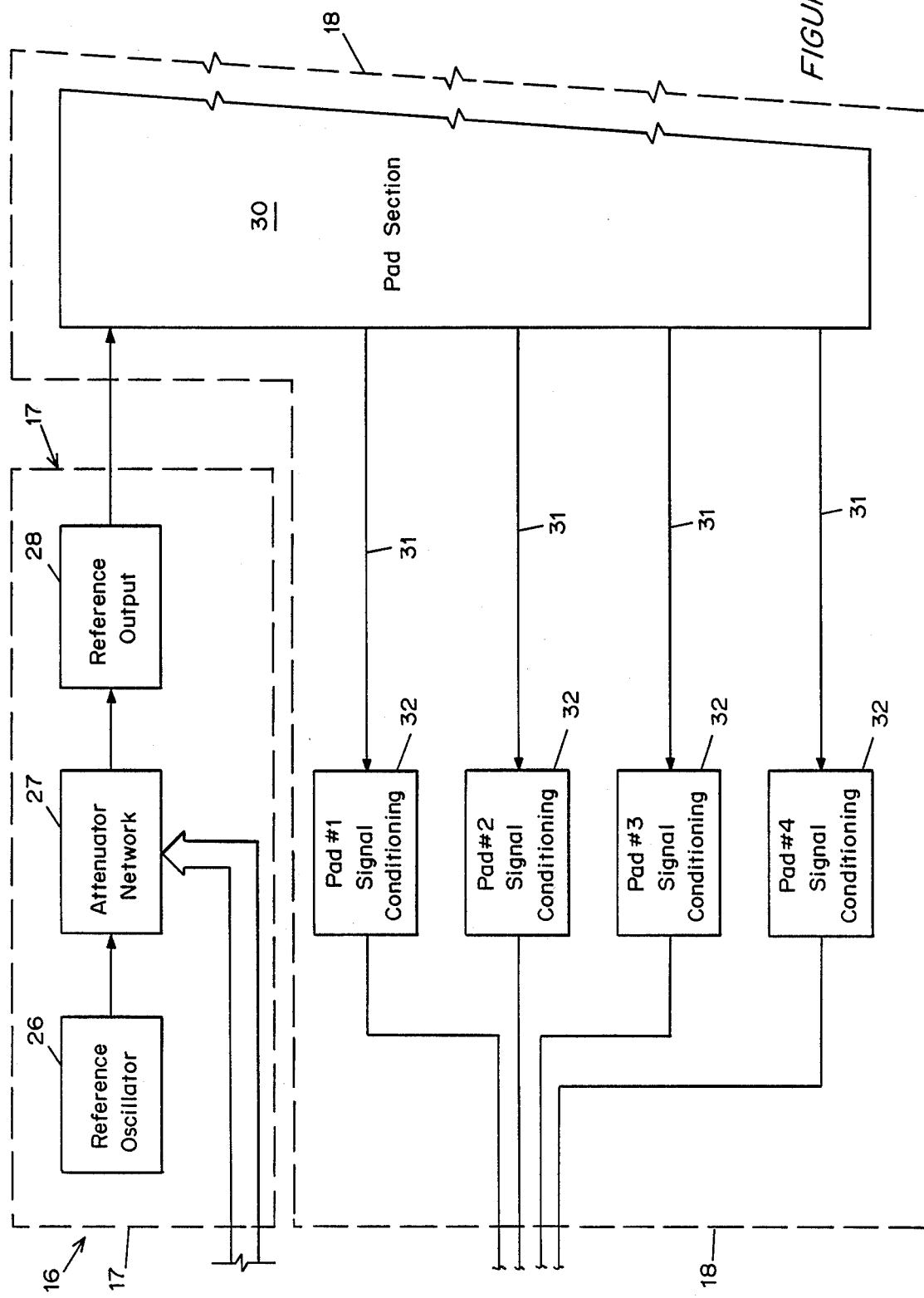

FIGS. 2A and 2B are block diagrams of the downhole dip meter apparatus. As may be seen from FIGS. 2A and 2B, the downhole dip meter well logging apparatus is comprised of four major components: telemetry/processing circuitry 16, oscillator circuitry 17, pad circuitry 18, and control bit generating circuitry 19.

Referring again to FIG. 2A, and more particularly to telemetry/processing circuitry 16, logging cable 12 is used as a conduit between the downhole circuitry and surface circuitry 25. Cable 12 preferably has several distinct lines or channels for transferring different types of information between the surface and the downhole apparatus. Circuitry 16 has a cable communications unit 18A for converting data signals obtained by the downhole apparatus into a suitably modulated form for transfer to the surface and vice versa. Interconnected with unit 18 is a microprocessor 20 having several functions, including the performing of a probe data smoothing algorithm as will be more fully discussed below.

Interconnected with microprocessor 20 is a programmable read only memory (PROM) unit 21 one of whose functions is to store the smoothing algorithm software A random access memory (RAM) unit 22 is also interconnected with microprocessor 20 for storing various intermediate results obtained during the running of the smoothing algorithm and the like, as well as other functions conventional to the operations of a microprocessor and well known. Also a part of circuitry 16 is an instrument bus master unit 23 which matches the impedances of the various devices in the downhole apparatus.

Referring now to FIG. 2B, oscillator circuitry 17 is used to generate an alternating current for emission into the earth formation surrounding borehole 11. Oscillator circuitry 17 is comprised of three major components: a low frequency reference oscillator 26, electronic attenuator 27, and a reference output unit 28 for buffering the attenuated signal which is then delivered to the pad section 18 and thereafter into the formation to be investigated.

Figure 3:
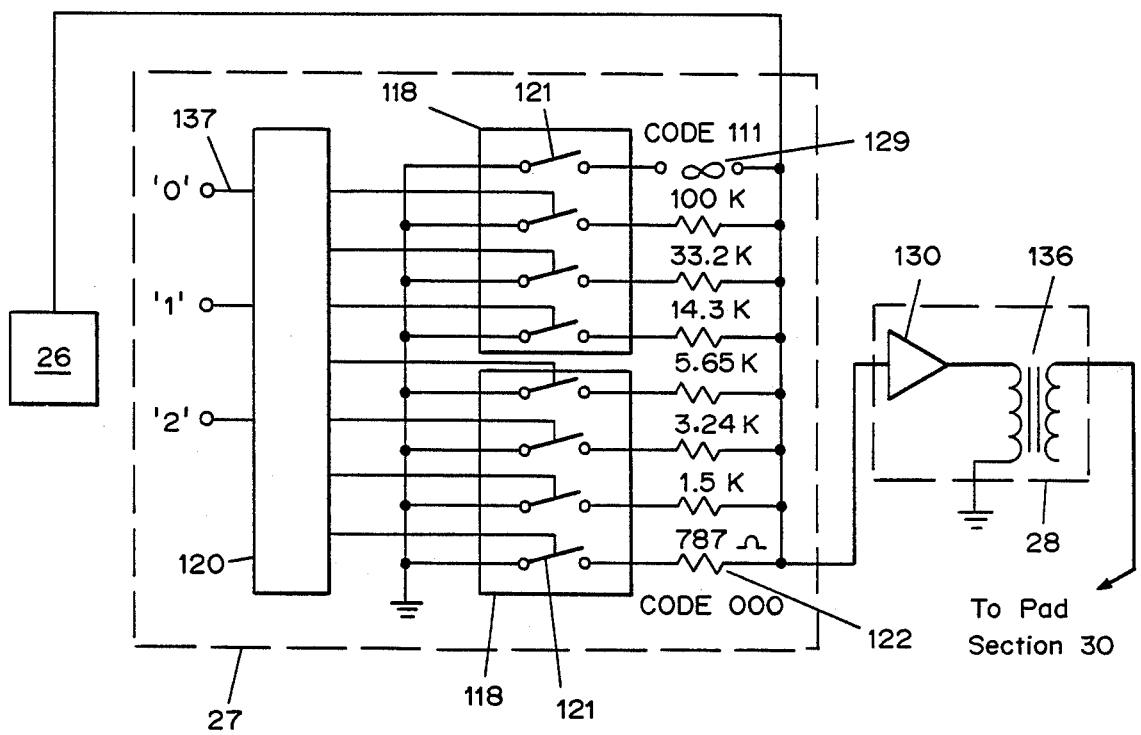
FIG. 3 is a more detailed schematic drawing of the attenuator network of FIG. 2B.

Referring now to FIG. 3 which depicts, in further detail, the attenuator 27 of FIG. 2B, three voltage control bits (VCB's) 137 are routed from the microprocessor 20 to the terminals labelled 0, 1 and 2 of attenuator network 27. The VCB's act as correction values to instruct the attenuator network 27 by what amounts to adjust the voltage of a pad electrode in order to keep the measured voltage signals within a predetermined range. The VCB's are derived from measured signals of previous samples taken at other depths in a manner hereinafter described and thus are functionally related to the magnitude of expected or future formation measurements. The VCB's are continuously recalculated in light of previously derived measurements, as discussed below.

The VCB's are decoded by a binary-decimal unit 120. The signals are routed to switching units 118. One of switches 121 will be closed depending upon the value of the decoded or digitized VCB signal. Thus, if the digitized VCB signal corresponds to the lowest level of the pad voltage (i.e., code 000), the lowermost switch 121 will be closed and resistor 122 will be engaged. Similarly, if maximum voltage is required (i.e., code 111), uppermost switch 121 will be closed and resistance 129 (here, an infinite resistance) will be used.

The resulting signal from attenuator network 27 may be amplified and buffered by means of amplifier 130 and transformer 136. Transformer 136 provides a high current capability to maintain the pad at a constant voltage. The constant voltage from transformer 136 is then applied to probe pads 15 and to emitting electrodes 52 in a well-known conventional manner.

Thus in general, it may be appreciated that in responce to VCBs 137 generated by microprocessor 20, attenuator 27 will attenuate output of oscillator 26 in discrete steps prior to amplification of attenuator output 28 and delivery to pad section 30 and ultimately into the formation.

It should be noted that FIG. 3 is a drawing for only a single probe pad. Similar sets of circuitry may be used for each probe pad in quadrature in the case of dip meter measurement.

Figure 4:
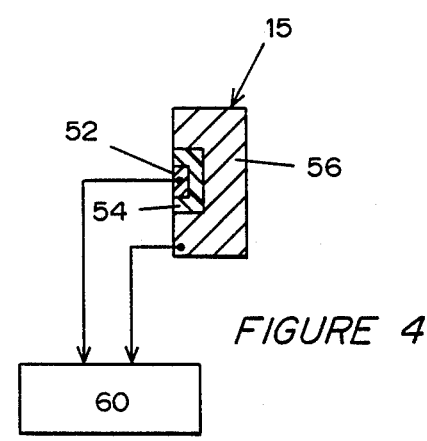
FIG. 4 is a cross-sectional schematic view of a probe pad electrode.

To obtain formation penetration, it is necessary to prevent short circuiting from the emitting electrode or button 52 by the conductive drilling fluid immediately fronting the button. FIG. 4 depicts a cross-sectional view of a typical probe pad 15 contained in pad section 30 Probe pad 15 is comprised of pad button electrode 52 which emits current into adjacent earth formations. Adjacent to button 52 and encircling it is an insulator 54, which in turn is encircled by the metal guard electrode 56. The potential difference between pad button 52 and metal guard electrode 56 is continuously monitored and maintained near zero by guard circuitry 60 thus forcing current from the button electrode into the formation.

Referring again to FIG. 2B, the output signals of pad section 30 corresponding to measured signals for each probe pad 15 are transmitted via lines 31 to pad signal conditioning circuitry 32. Pad conditioning circuitry 32 detects, filters, and amplifies the voltage corresponding to the current into the formation by pad button 52 in ways which are well known in the art. A synchronous detector circuit is used to filter out undesirable noise whereby the synchronous detector is driven by the same oscillating signal output to the probe pads by attenuator network 27, so that signals of frequencies other than that of the injected current are rejected. Such synchronous detectors are well known in the art.

Referring now to FIG. 2A, after a pad signal has been rectified and filtered, it is sent via line 40 to data acquisition subsystem 41. Subsystem 41 also acquired data from other systems relating to other variables such as the orientation of tool 10 and borehole temperature. This information as sent on interface 42 which interfaces through the master bus 23 with microprocessor 20 and with a timing and control unit 43 which controls the sending of acquired signals to microprocessor 20 and instructions from the microprocessor 20 to the tools including tool 10.

Figure 5:
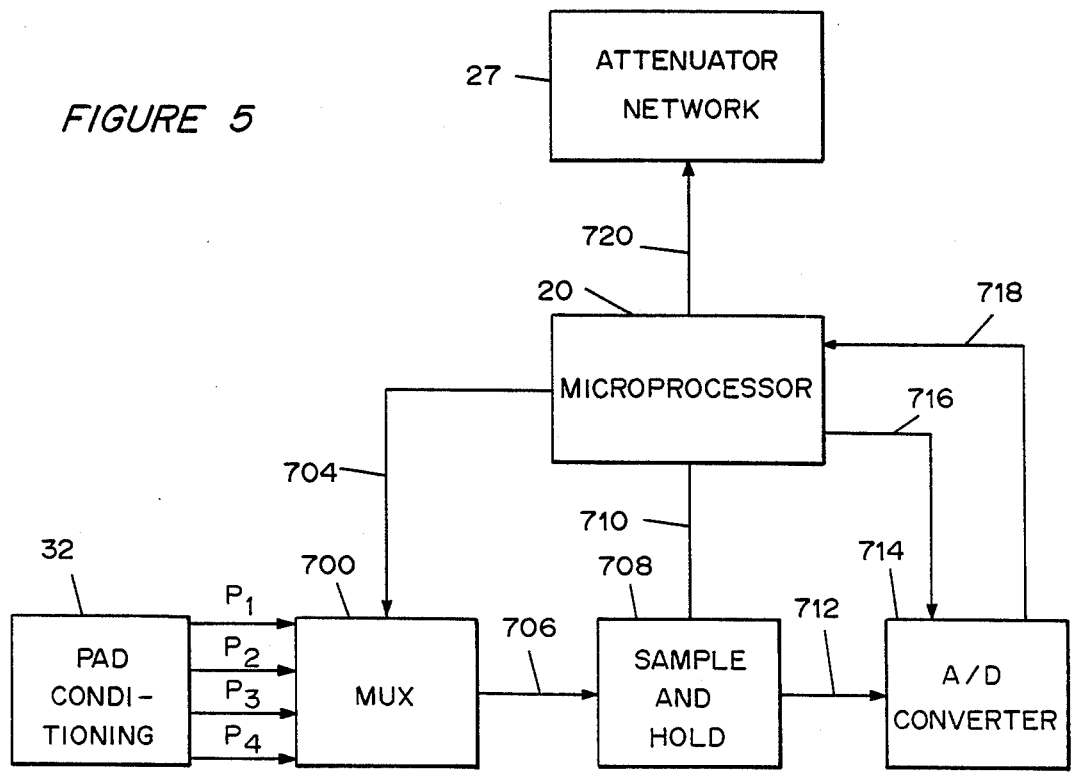
FIG. 5 is a more detailed functional block diagram of a portion of the circuitry of FIGS. 2A and 2B.

Referring now to FIG. 5, there may be seen more functional details of a portion of the data subsystem 41 of the control bit circuitry 19 of FIG. 2A and its relation to microprocessor 20 of process circuitry 16 and to attenuator 27 of oscillator circuit 17. Multiplexer 700 sequentially accepts the slow varying d.c. signals output from each pad conditioning circuit 32. Microprocessor 20 sends a control signal via line 704 instructing multiplexer 700 when to accept and to output the pad signals $P_1$, $P_2$, $P_3$ and $P_4$. The pad signals are routed one at a time via line 706 to Sample and Hold unit 708. Microprocessor 20 sends a control signal via line 710 to Sample and Hold 708 instructing it when to sample and hold each of the varying d.c. pad signals. Sample and Hold 708 outputs the signals via line 712 to an analog-to-digital converter 714. Microprocessor 702 instructs A to D converter 714 via line 716 to sequentially convert the received signal to digital form. The resulting binary numbers are sent via line 718 from A to D converter 714 to microprocessor 20, whereupon a smoothing algorithm is performed on each digitized pad signal, as will be discussed below.

While the input signal from one pad is being sampled by Sample and Hold 708 and being digitized by A to D converter 714, multiplexer 700 will accept, at the direction of microprocessor 702, another pad signal. Thus, two or more distinct pad signals derived at the same borehole depth may be sequentially sampled, digitized and smoothed by a smoothing algorithm, thereby increasing processing efficiency.

When microprocessor 20 receives a digitized pad signal, it performs a smoothing algorithm. The purpose of the smoothing algorithm is to average successive digitized signals from each pad over a particular depth range. Gain adjustments will not be made after each reading, but only after the averaging depth range has been traversed. Of course it is within the scope of this invention to adjust the gain where needed after each pad reading or to change the averaging length. In a preferred embodiment, however, four pad readings are obtained every one-sixty-fourth (1/64) of a foot in depth, but are averaged by a smoothing algorithm over a two (2) foot depth. A two foot depth interval was chosen by trial and error, as a desired depth interval simulating the response time of a human operator to large signal excursions.

An example of a smoothing algorithm separately used for each pad signal is given by the equation:

$$Y_N = X_N + K(Y_{N-1} - X_N)$$

where
$X_N$ = present sample reading of a pad
$Y_{N-1}$ = running average of prior sample readings
$Y_N$ = updated running average incorporating present sample reading
K = a constant given by $K = e^{-t/T}$ which is approximately equal to $(1 - t/T)$ where
t = a time interval functionally related to the sample depth interval (1/64 foot)
T = a time constant, functionally related to the smoothing depth interval (2 feet)

Due to the large number of multiplications which need be performed by the microprocessor to implement the above smoothing algorithm, it is desirable to minimize the number of required iterations. Techniques for so minimizing are well known in the art.

Figure 6:
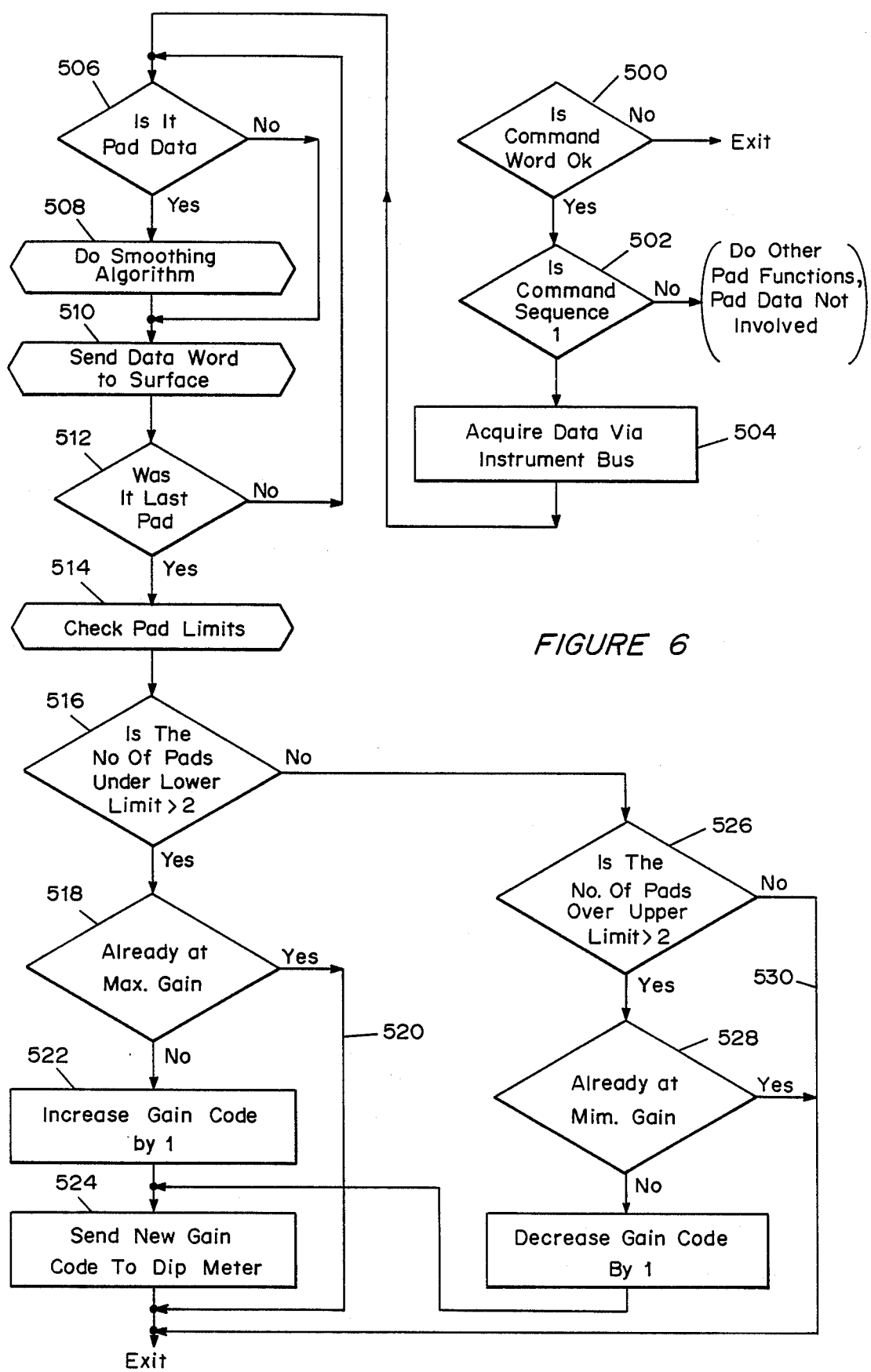
FIG. 6 is a flow diagram of a typical sampling operation according to the present invention.

FIG. 6 is a flow diagram of the steps carried out by microprocessor 20 during a typical dip meter downhole sampling operation. As shown in FIG. 6, a command word from the surface is received and decoded downhole by cable communications 18A instructing the downhole microprocessor 20 to sample a dip meter measurement. Comparator step 500 determines whether the word received is in the proper form of a command word. If not, the sampling operation does not proceed. If the word is of proper form, comparator 502 decides whether the command word has the proper sequential form corresponding to a command to acquire data. If not, other non-acquisitional functions, such as the processing of already acquired data is performed. At step 504 the data is acquired, after which a comparator step 506 determines whether the acquired data corresponds to measured pad signals or to other data such as dip meter orientation measurements, depth measurements, etc. If the acquired data is not pad data, it is sent via step 510 to the surface for processing or interpretation. If the data acquired at step 504 is pad data, a smoothing algorithm is performed via step 508, as will be discussed below. Then the smoothed value is sent to the surface via step 510. Comparator step 512 determines whether pad data from all the pads has been acquired. If not, the data acquisition routine is run again.

A routine is now performed for determining whether the voltage of the pad electrodes should be adjusted to maintain the expected signal measurements for the next probe pad sample within a desired range. This routine determines the nature of such gain adjustments, if any, thereby determining the values of the reference voltage control bits (VCB's). These VCB's will be later transmitted by the microprocessor to the attenuation network 27 of FIG. 3, and will be used to adjust the gain, if needed, before the next set of smoothed pad data is determined. The three VCB's form a three digit binary word, each increment or decrement of which determines an adjustment in and by a factor of two. The value of the three digit gain code is equivalent to the exponent of a base two form of the gain adjustment. Thus, if the gain code is 111=7, the gain adjustment will produce $2^7 = 128$ times the lowest emitted current or voltage. The maximum gain is thus 128 or code 111.

Referring again to FIG. 6, comparator step 516 determines whether the number of pad signals smoothed or averaged over the depth interval (2 feet) having values under a lower limit is greater than two. Thus, step 516 determines whether there is a difference between the apparent magnitude of a smoothed pad signal and a desired range of magnitudes. This range of magnitudes is determined by predetermined upper and lower limits, as discussed below. The lower limit is a point such as one-eighth of the full scale dynamic range of the A/D converter 714 of FIG. 5. If more than two of the received pad signals are below the lower limit, it is desirable to increase the value of the emitted pad current so that future sample readings will not be so small as to be confused with noise. If three such signals are within the lower limit-upper limit range no gain change is required. However, if more than two (i.e., three or four) of the smoothed pad signals are below the lower limit, then it is desirable to increase formation current flow as discussed.

If the comparison step 516 results in an affirmative result, step 518 determines whether the maximum gain (i.e., control bit code 111) has already been reached. If so, the routine ends via control step 520. If not, the gain code is increased by a binary 1 at step 522 resulting in an actual gain increase by a factor of two. The new gain code is then sent to the tool at step 524, after which the routine ends.

If the result of comparator step 516 is a negative, then two or more smoothed pad signals are above the lower limit. In this event, comparator step 526 determines whether more than two of smoothed pad signals are greater than an upper limit. The upper limit is preferably one-half of the full scale deflection of the dynamic range of A/D converter 714. Ideally, the digitized pad output or received signals held in the A/D converter 714 will be maintained within the range of one-eighth to one-half of the full scale dynamic range thereof. If the result of comparator step 526 is a negative, then two or more of the smoothed pad signals are within the desired range. As previously discussed with two pad signals within the desired range, no gain adjustment is made and the routine ends via line 530. If comparator step 526 results in an affirmative, it is desirable to decrement the gain. Step 528 determines whether the gain is already at minimum or zero. If so, the gain cannot be decremented, and the routine ends via line 530. If the minimum gain has not been reached, the gain code is decreased by a binary 1, resulting in an actual gain reduction of one-half. The new gain code is sent to the tool at step 524 and the routine ends.

It will be appreciated that numerous gain control algorithms may be used as alternatives to the one depicted in FIG. 6. Indeed, one of the major features of the present invention is that, if a programmable microprocessor is used, new gain control software may be easily substituted to achieve more effective gain control with respect to the particular earth formation being explored even during a logging operation. Thus, a different averaging interval such as 10 feet may be used, for example, depending upon the formation characteristics encountered.

Figure 7:
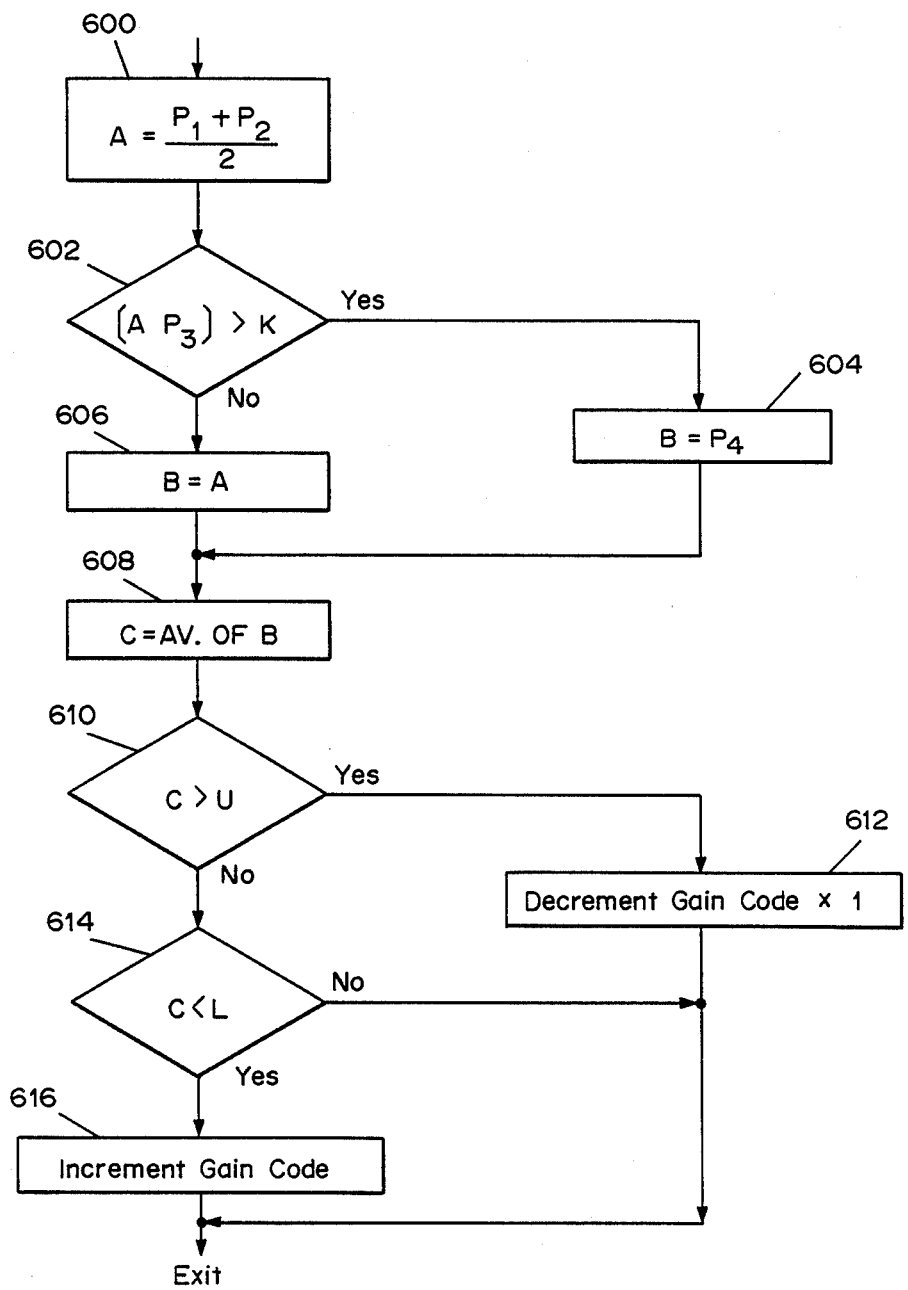
FIG. 7 is a flow diagram of a typical gain control algorithm of the present invention.

An example of an additional algorithm is shown in FIG. 7. Four probe pad output signals are measured and designated $P_1$, $P_2$, $P_3$, and $P_4$. Two of these measured values, $P_1$ and $P_2$, are averaged at step 600. Comparator step 602 determines whether a third pad value $P_3$ is within a range of K of the average of $P_1$ and $P_2$, where K is a constant. If $P_3$ is not within this range, then it is clear that either $P_1$, $P_2$ or $P_3$ significantly deviates from the other pad values although it is uncertain which. Such deviation may be caused by several factors, such as poor formation-probe pad contact resulting in unjustifiably high resistance reading, or by the presence of a low resistivity salt solution within the formation. If such a substantial deviation exists, all three values $P_1$, $P_2$ and $P_3$ are rejected and $P_4$ is chosen at step 604 as an accurate sample value. $P_4$ may be chosen with confidence in its accuracy since it is highly unlikely that two pad values will be inaccurate. If $P_3$ is within K of the averaged value, the averaged value, $(P_1+P_2)/2$, is chosen at step 606 as an accurate sample value A running average C of all chosen values is updated at step 608. More samples are taken and the above routine is repeated until values corresponding to a borehole depth of 2 to 12 feet have been obtained. The running average is then calculated in accordance with the previously set forth smoothing algorithm or some other such desired algorithms and the result compared at step 610 to determine whether the average is greater than an upper limit, U. As discussed in reference to FIG. 6, the upper limit U as well as a lower limit L are chosen to be a function of the analog-to-digital converter range. U is preferably one-half of the A to D 714 range. If the running average C is greater than the upper limit U, the gain code is decremented by 1 at block 612. This results in an actual decrease of the emitted electrode voltage by a factor of $2^1=2$. The routine then ends. If the running average C is less than or equal to the upper limit U, comparator 614 determines whether C is less than a lower limit L. If not, then C is within the desired range between U and L, and the routine ends without a gain control adjustment being made. If C is less than L, the gain control code is incremented by 1 at step 616, and the routine ends.

Regardless of which gain control algorithm is used, the resulting adjusted gain control code is stored in RAM unit 22. After a predetermined borehole depth has been traversed by tool 10, microprocessor 20 sends the voltage gain control bits (VCB's) to the terminals of attenuator network 27 as discussed above. The gain of the emitted currents for the samples obtained over the next depth interval will be adjusted based upon adjustments made upon running averages of prior sample currents, as indicated by the correction value or VCB. Thus it is seen that a history of gain adjustments is used in a feedback loop to help maintain future, expected sample readings within a predetermined range. Moreover, these digitized VCB's or "gain codes" may be transmitted to the surface along with the actual digitized sample value residing in the A/D converter and corresponding to each sample. Thus a typical data word, for example, would consist of 12 bits (similar to the "mantissa") of the actual sample value and 3 bits indicating the binary multiplier or gain code (similar to the "ordinate") associated with the particular sample.

The VCB's are continually adjusted and stored in random access memory (RAM) unit 22. In addition, the pad signals as adjusted are also recorded on tape or stored in RAM unit 22. The stored correction values (VCB's) and the stored adjusted apparent magnitudes of the pad signals may be correlated to obtain visual or numerical representations of formation resistivities. Since representations of actual formation resistivities may thus be derived, the information obtained is more informative of true formation characteristics than if relative resistivities are derived, which has been typically the case in conventional dip meters previously known.

Figure 8:
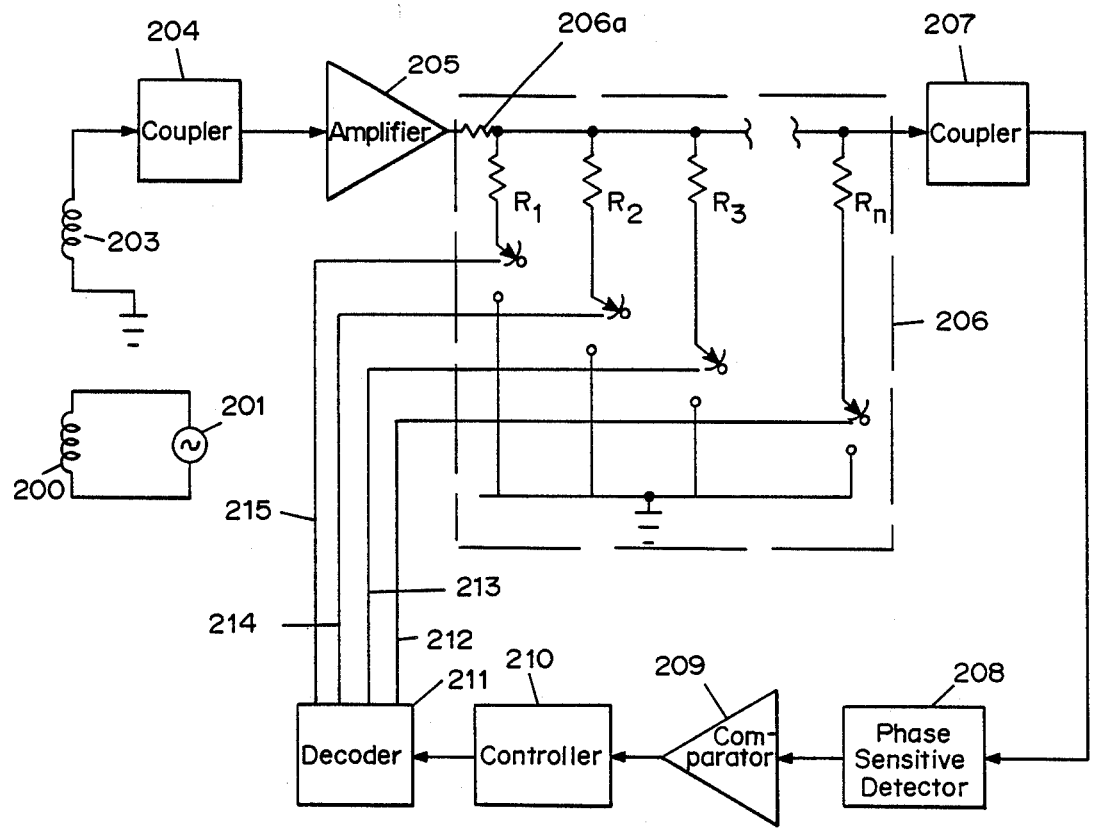
FIG. 8 is a functional block diagram of an embodiment of the present invention.

In FIG. 8 there may be seen an embodiment of the present invention particularly suited to conducting formation measurements of the induction log type. The present invention concerns provision for novel dynamic range control features adapted to induction type logging tools. Accordingly, detailed explanation of the basic theory and operation of induction logging tools will not be herein set forth.

As previously noted, it is conventional to provide in an induction logging tool 10 a transmitter coil 200 which may be excited by a 20 KHz alternating current from a constant current source 201 disposed within the tool 10. Upon such excitation of transmitter coil 200, an electric field is produced in the surrounding formation of interest which will induce flow of eddy currents within the formation. This flow will, in turn, induce a voltage in an appropriate receiver coil 203 also disposed within induction logging tool 10, the magnitude of this induced voltage being proportional to conductivity of the formation to be measured It should be noted that the phenomenon employed to detect this formation parameter is to be contrasted with the previously described technique with respect to dip meter type resistivity measurements. In the latter case, an alternating current, typically of 270 Hz, flows from a "button" or electrode 52 into the formation which is received by the tool 10, and it is the magnitude of this current which is indicative of formation conductivity.

Still referring to FIG. 8, a suitable impedance matching device or AC coupling means 204, well known in the art, may be provided which either provides transformer or capacitive coupling between receiver coil 203 and a high gain AC receiver amplifier 205. The purpose of amplifier 205 is to amplify the received voltage induced in the receiver coil 203, typically by a factor of $10^4$–$10^5$.

After amplification of the received signal, the output of amplifier 205 is thereafter preferably delivered to an attenuator network 206 which includes a series resister 206a, which may be of the form depicted in FIG. 3. Amplitude of the output signal of amplifier 205 is attenuated by attenuator 206 in a manner to be hereinafter described and thereafter delivered to an appropriate coupling means 207, the purpose of which is, in like manner to coupling means 204, to match impedance between the output of attenuator 206 and amplifier 205 to the input to a phase sensitive detector 208 to which the output of coupler 207 is delivered.

Figure 9:
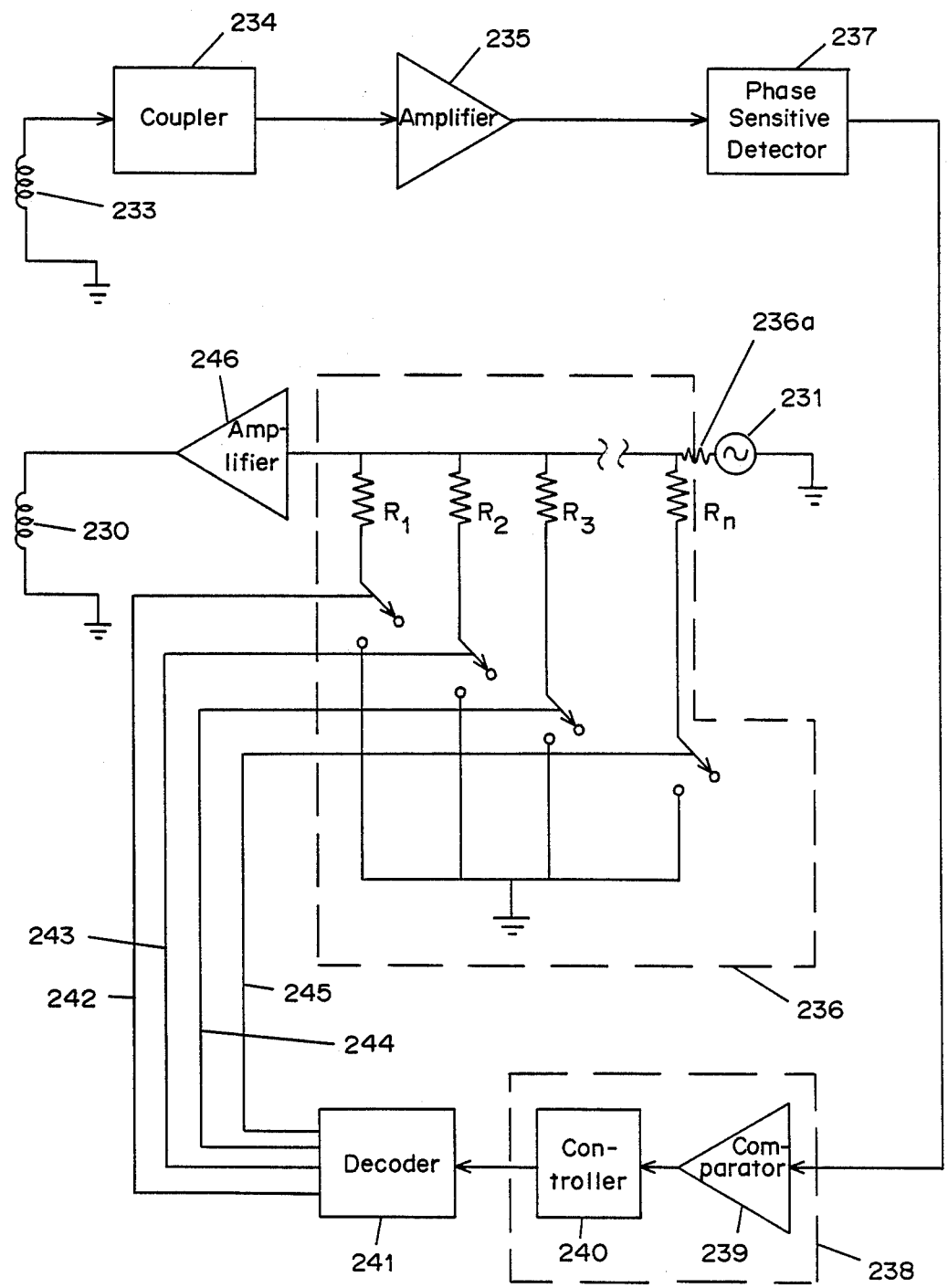
FIG. 9 is a functional block diagram of another embodiment of the present invention.

The purpose of phase detector 208 is to provide a DC output proportional only to such 20 KHz AC signals received by receiver coil 203 which are in phase with the 20 KHz current in transmitter coil 200 as previously described. Thus the 20 KHz signal (which will also be present in the receiver coil 203) induced in receiver coil 203 by mutual transformer-type coupling between transmitter coil 200 and receiver coil 203 will be rejected. It will be noted that in order for phase detector 208 to reject those input signals out of phase with current source 201 that phase information with respect to the source 201 must be provided to the detector 208 which is the case (although such a phase information signal from either the current source 201 of FIG. 8 or current source 231 of FIG. 9 are not depicted therein).

It will be appreciated that the DC output of phase detector 208 will correspond to and be proportional with conductivity of the formation adjacent the logging tool 10 at the time of measurement and that, accordingly, the DC value of the phase detector 208 output will slowly vary within a range corresponding to variation in the formation conductivity as the logging tool 10 traverses the borehole 11.

Still referring to FIG. 8, the output of phase detector 208 will thereafter be preferably delivered to a comparator 209, the purpose of which is to compare the output of phase detector 208 to a predetermined maximum and minimum DC control voltage level. The comparator 209 may thus be of a conventional analog type known in the art. Alternatively, means may be provided (not shown) for digitizing the phase detector 208 output and thereafter routing this digitized output signal to a digital comparator also well known in the art. Regardless of whether an analog or digital comparator 209 is employed, the output thereof will preferably include one signal indicating when the output of detector 208 exceeds the aforementioned predetermined maximum level, and yet another different signal indicating when the output of phase detector 208 is below the aforementioned minimum predetermined value.

Still referring to FIG. 8, an appropriate controller 210 may be provided which will receive the hereinbefore described output of comparator 209. The controller 210 may preferably take the form of a conventional digital up/down counter such that in response to outputs from comparator 209, controller 210 will increment by a discrete predetermined amount (such as 1 bit) each time the output signal of comparator 209 indicates that the output of phase detector 208 has exceeded the predetermined maximum value. In like manner, controller 210 may be further designed so as to decrement by a preselected amount (such as 1 bit) each time the comparator 209 output indicates that the output of phase detector 208 has dropped below the minimum predetermined level of comparator 209. In this manner, it will be seen that the controller 210 may be designed so as to provide a plurality of digital voltage control bits (VCB's) in like manner to those previously described, the bits varying in accordance with the magnitudes of the signals detected by the phase detector 208 and thus corresponding to the aforementioned gain code.

For purposes of illustration, it may be assumed that the output of controller 210 is a digital word 001 which is delivered to the decoder 211. The purpose of decoder 211 is to decode the digital word from controller 210 and translate this word into signals appearing on outputs such as 212–215. It will be seen from further reference to FIG. 8 that these outputs 212–215 are, in turn, routed to the attenuator network 206, and, more particularly, to a series of respective switches contained therein. Each switch and its corresponding output 212–215 will determine whether its respective resistor $R_1$–$R_N$ will be introduced as additional attenuation between the output of amplifier 205 and the coupler 207. With reference to FIG. 3, the resistors $R_1$–$R_N$ are preferably sized in a conventional manner so as to be increasing in resistance by a factor of 2.

Continuing with the present example which assumes a VCB output from controller 210 of the digital word "001" which is delivered to the decoder 211, presence of the "1" will cause an appropriate signal on decoder output 215 to be delivered to the switch directly below the $R_1$ resistor causing the switch to close and thus introducing the $R_1$ resistor into the attenuator 206 circuit. In like manner presence of the 00 preceeding the 1 will cause the decoder to provide 0 outputs on decoder outputs 213 and 214 to their respective switches such that their respective resistors will not be introduced into the attenuator 206 circuit.

Assuming now that after measurement of a next induction logging measurement by receiver coil 203 that the phase detector 208 and comparator 209 have thus determined that the input signal to phase detector 208 and corresponding input to comparator 209 have exceeded the aforementioned predetermined maximum value, a corresponding output from comparator output 209 will thus be delivered to the controller 210 causing its value to increment. Accordingly, the VCB output of controller output 210 will increment by one and thus change from 001 to 010. This output will be delivered to decoder 211 wherein the shift of the location of the 1 will be detected by the decoder 211. In turn, this will cause the decoder output 214 to go high whereas the output 215 will change from a 1 to a 0 and the outputs 213 and 212 will remain 0, in turn, causing closing of the switch below the $R_2$ resistor and the opening of all the remaining switches. Because the resistor $R_2$ is sized to be one-half that of $R_1$, by the VCB or gain code incrementing by one, attenuation of the attenuator network 206 has thus doubled. It may therefore be seen from this example that the gain code output of controller 210 will control the attenuation of the attenuator network 206 provided to the output of amplifier 205 in a discrete digital fashion whereby every time the gain code is incremented by one in the controller 210 attenuation is doubled, and conversely, every time the controller 210 is made to decrement by one by the comparator 209 the attenuation of network 206 is decreased by a factor of one-half. Thus, in accordance with the present invention, the magnitude of the input signal into the phase detector 208 may be controlled within any desired minimum and maximum range. If the input signal to the phase detector 208 exceeds this range this will be detected by the comparator 209, and ultimately, additional known attenuation will be introduced by the attenuator network 206 in response to the controller 210 and decoder 211. Conversely, should the input signal to the phase detector 208 decrease below the minimal optimum range for accurate phase detection by the detector 208, the magnitude of the input signal to the detector 208 will thus be increased by decreasing attenuation of the attenuation network 206.

Referring now to FIG. 9 there will be seen an alternate embodiment of the present invention depicted in FIG. 8. In like manner to the implementation of FIG. 8, a transmitter coil 230 is provided which is excited preferably at 20 KHz by a current source 246, the result of which is the formation of induced eddy current flow within the formation of interest. Also in like manner to the embodiment of FIG. 8, an appropriate receiver coil 233 may be provided in the logging tool 10 for receiving voltage signals induced therein by the aforementioned eddy current flow, these signals being provided to an appropriate high gain instrumentation amplifier 235, the input of which is matched to the receiver coil 233 by an appropriate coupler 234. The amplifier 235 output is thereafter delivered to a phase sensitive detector 237 which, also in like manner to the embodiment of FIG. 8, will provide a DC output the magnitude of which corresponds to formation conductivity.

The output of phase detector 237 is thereafter preferably delivered to a comparator 239 which provides an output indicating when the output of phase detector 237 exceeds or falls below a preselected magnitude range. The output of comparator 239 is thence delivered to controller 240 which functions in the same manner as controller 210 to provide an output gain control code or VCB which varys in accordance with the magnitude of the signal received by the receiver coil 233 in a manner previously described. The output of controller 240 is thereafter delivered to a decoder 241 which, in turn, decodes the gain control code output of the controller 240 to control the discrete switching of resistors in an attenuator network 236 including series resistor 236a in response to decoder output signals 242-245, also in a manner similar to the correlative decoder 211 of FIG. 8.

Two features of the embodiment depicted in FIG. 9 are of particular importance with respect to the present invention. First, it will be appreciated from a comparison of FIGS. 8 and 9 that in FIG. 8 the attenuator network 206 is provided between the high gain amplifier 205 and the phase detector 208 thus controlling the magnitude of the input to the phase detector 208 by adjusting the attenuation of the signal received by the receiver coil 203.

However, in the implementation disclosed in FIG. 9, it will be appreciated that the attenuator network 236 which corresponds to attenuator network 206 of FIG. 8 is introduced in between the constant voltage source 231 and the transmitter coil 230 or, more precisely, the attenuator network 236 is introduced between the aforesaid voltage source 231 and a conventional amplifier 246 the purpose of which is to drive the transmitter 230 with a current proportional to the attenuated voltage from source 231 said voltage attenuated by attenuator 236 in a manner well known in the art. Of importance is the distinction over the FIG. 8 embodiment that unlike FIG. 8, wherein the current of transmitter coil 200 is relatively invariant and it is the received signal which is attenuated, in the case of the FIG. 9 embodiment, the current of the transmitter coil 230 itself is varied in a discrete manner in accordance with the present invention by the attenuator network 236 which, in turn will vary the magnitude of the induced eddy currents and thus the signal received by the receiver coil 233. In this manner, it will be appreciated that restriction of the input signal to the phase detector 237 is thus controlled within a fixed and predetermined magnitude range in which the phase detector 237 will be designed to operate optimally.

Yet another difference between the embodiments depicted in FIGS. 8 and 9 is that in FIG. 9 there is depicted functionally a processor unit 238 which may be comprised of a conventional digital computer or microprocessor disposed either within the logging tool 10 or located at the well site surface and in communication with the subsurface logging equipment in a manner previously described with respect to FIGS. 2A and 2B. Thus, it will be appreciated that the aforementioned and described functions of the controller 240 and the comparator 239 may be performed in an alternative embodiment by a digital computer. It should further be appreciated, however, that in like manner, the controller 210 and comparator 209 functions depicted in FIG. 8 may also be implemented by an appropriate digital computer or microprocessor located either at the borehole surface or in the logging instrument.

This computer, in addition to simulating the function of controller 240 and comparator 239 (which may also be embodied in hard wired discrete digital or analog component circuitry), may also provide the previously described additional functions of maintaining a running average of prior or historical logging measurements output by phase detector 237. Moreover, as previously described, due to the flexibility of such computerized approaches, it is specifically contemplated that various strategies and routines for adjusting the attenuator network 236 may be provided by the processor unit 238 rather than simply controlling the setting of the attenuator 236 in response to only the single previously received output measurement from the phase detector 237. For example, the processor unit 238 may be programed in like manner to that disclosed in FIG. 5, to implement the smoothing algorithm previously described whereby the setting of the attenuator 236 is in response to a historical average of signals received by the receiver coil 233.

While not indicated in FIG. 9 it is also specifically contemplated that, as with the embodiments of FIGS. 1-7, the gain control code or VCBs as well as the measurement voltages may be transmitted to the surface for recording, display and the like by means of the communication link herein disclosed between the wellsite and subsurface tool 10 location.

It is therefore apparent that the present invention is one well adapted to obtain all of the advantages and features hereinabove set forth, together with other advantages which will become obvious and inherent from a description of the apparatus itself. It will be understood that certain combinations and subcombinations are of utility and may be employed without reference to other features and sub-combinations. This is contemplated by and is within the scope of the present invention.

The embodiments of the invention in which an exclusive property or privilege is claimed is defined as follows:

1. A well logging tool adapted to be disposed within a borehole for inductively investigating characteristics of an earth formation, including apparatus for controlling the gain of formation measurements in response to the phase of said formation measurements, comprising:
   means for inducing alternating current flows into said formations;
   means for generating measurement signals in response to said flows;
   means for deriving an average measurement signal functionally related to said measurement signal and at least one other measurement signal derived at a depth within said formation different from the depth at which said measured signal is derived, said means for deriving an average measurements signal being interconnected to said means for generating measurement signals;
   means for comparing said average measurement signal to a predetermined range of measurement signals interconnected to said means for deriving said average measurement signal;
   means for generating a control signal in response to said comparison interconnected to said means for comparing average measurement signals; and
   means for adjusting the magnitude of said measurement signals by adjusting the magnitude of said induced current flow in response to said control signal, said means for adjusting interconnected to said means for generating a control signal and to said means for generating said induced current flow signals.

2. The apparatus of claim 1, further including:
   means for comparing the phase of said measurement signal to the phase of said induced current flow interconnected to said means for generating measurement signals and to said means for inducing alternating current flow; and
   means for generating a phase detector output signal corresponding to said measurement signal and said comparison of said phase of said measurement signal and said phase of said induced current, said means for generating a phase detector output signal means for being interconnected to said means for comparing the phase of said measurement signal and said means for generating said measurement signals.

3. The apparatus of claim 2, wherein:
   said means for comprising said average measurement signal includes means for comparing the magnitude of said phase detector output signal to a predetermined maximum and a minimum magnitude interconnected to said means for generating a phase detected output signal; and
   wherein said means for generating a control signal includes means for generating a first control signal in response to said comparison of said magnitudes when said phase detector output signal exceeds said predetermined maximum magnitude, and means for generating a second control signal in response to said comparison of said magnitudes when said phase detector output signal is less than said predetermined minimum magnitude.

4. The apparatus of claim 3, further comprising:
   means for increasing the magnitude of attenuation of said induced current flow signal by a first preselected discrete amount in response to said first control signal and for decreasing the magnitude of attenuation of said induced current flow signal by a second preselected discrete amount in response to said second control signal.

5. The apparatus of claim 4, wherein said first preselected discrete amount is a factor of 2 and second said discrete amount is a factor of $\frac{1}{2}$.

6. The apparatus of claim 5, further including:
   means for storing said control signals and said measurement signals interconnected respectively to said means for generating said control signals and said means for generating said measured signals.

7. The apparatus of claim 6, further including:
   means for transmitting said control signals and said measurement signals to the earth surface interconnected to said means for storing said control signals and said measurement signals.

8. The apparatus of claim 6, further including:
   means for maintaining said magnitude of attenuation at a previous level in the absence of said first and second control signal interconnected to said means for storing said control signals and said measurement signals.

9. The apparatus of claim 8, wherein said means for generating a control signal includes
   means for maintaining a cumulative count of said first and second control signals;
   means for generating a binary number in response to said cumulative count; and
   means for decoding said binary number.

10. A method for inductively investigating characteristics of an earth formation including a well logging tool adapted to be disposed within a borehole including controlling the gain of formation measurements in response to the phase of said formation measurements, comprising:
    inducing an alternating current flow into said formation;
    generating a measurement signal in response to said induced flow;
    deriving an average measurement signal functionally related to said measurement signal and at least one other measurement signal derived at a depth within said formation different from the depth at which said measured signal is derived;
    comparing said average measurement signal to a predetermined range of measurement signals;
    generating a control signal in response to said comparison;
    generating a next measurement signal in response to said flow; and
    adjusting the magnitude of said next measurement signal by adjusting the magnitude of said induced current in response to said control signal.

11. The method of claim 10, wherein the step of generating a measurement signal includes:
    comparing the phase of said measurement signal to the phase of said current flow; and generating a phase detector output signal corresponding to said measurement signal and said comparison of said phase of said measurement signal and said phase of said current flow.

12. The method of claim 11, wherein said comparing and generating steps further comprise:
   comparing the magnitude of said phase detected output signal to a predetermined maximum and minimum magnitude;
   generating a first control signal in response to said comparison when said phase detected output signal exceeds said predetermined maximum magnitude; and
   generating a second control signal in response to said comparison when said phase detected output signal is less than said predetermined minimum magnitude.

13. The method of claim 12, further including:
   decreasing the magnitude of said next induced current flow signal by a first preselected discrete amount in response to said first control signal; and
   increasing the magnitude of said next induced current flow signal by a second preselected discrete amount in response to said second control signal.

14. The method of claim 13, wherein said first preselected discrete amount is a factor of ½ and second discrete amount is a factor of 2.

15. The method of claim 14, further including the steps of:
   storing said control signals and said next measurement signal.

16. The method of claim 14, further including
   transmitting said control signals and said next measurement signal to the earth surface.

17. The method of claim 14, wherein the step of adjusting the magnitude of said next measurement signal includes:
   maintaining attenuation of said measurement signal at a previous level in the absence of said first and second control, signals.

18. The method of claim 17, wherein generating said control signal includes:
   maintaining a cumulative count of said first and second control signals;
   generating a binary number in response to said cumulative count; and
   decoding said binary number.

19. The method of claim 18, wherein said deriving an average measurement signal further includes:
   selecting said functional relationship of said measurement signal; and said at least one other measurement signal during said investigation of said formation.

* * * * *